(12) United States Patent
Kao et al.

(10) Patent No.: US 8,994,693 B2
(45) Date of Patent: Mar. 31, 2015

(54) LOCATING METHOD OF OPTICAL TOUCH DEVICE AND OPTICAL TOUCH DEVICE

(75) Inventors: Ming-Tsan Kao, Hsinchu (TW); Hsin-Chi Cheng, Hsinchu (TW); Teng-Wei Hsu, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 950 days.

(21) Appl. No.: 12/756,852

(22) Filed: Apr. 8, 2010

(65) Prior Publication Data

US 2011/0116104 A1 May 19, 2011

(30) Foreign Application Priority Data

Nov. 16, 2009 (TW) ............................. 098138898 A

(51) Int. Cl.
*G06F 3/042* (2006.01)
(52) U.S. Cl.
CPC .................................. *G06F 3/0428* (2013.01)
USPC ............ 345/175; 345/166; 345/173; 358/448
(58) Field of Classification Search
USPC ............................. 345/175, 166, 173; 358/448
See application file for complete search history.

(56) References Cited

U.S. PATENT DOCUMENTS

| | | | | |
|---|---|---|---|---|
| 7,746,326 B2 * | 6/2010 | Sato | ............................. | 345/173 |
| 2006/0132454 A1 * | 6/2006 | Chen et al. | ................... | 345/173 |
| 2006/0232830 A1 * | 10/2006 | Kobayashi | ..................... | 358/448 |
| 2008/0062149 A1 * | 3/2008 | Baruk | ............................ | 345/175 |
| 2009/0135162 A1 * | 5/2009 | Van De Wijdeven et al. | | 345/175 |
| 2009/0219256 A1 * | 9/2009 | Newton | ........................ | 345/173 |
| 2009/0278816 A1 * | 11/2009 | Colson | ........................... | 345/175 |
| 2009/0289910 A1 | 11/2009 | Hattori | | |
| 2009/0295755 A1 * | 12/2009 | Chapman et al. | ............ | 345/175 |
| 2010/0045634 A1 * | 2/2010 | Su et al. | ........................ | 345/175 |
| 2010/0321309 A1 * | 12/2010 | Lee et al. | ...................... | 345/173 |

FOREIGN PATENT DOCUMENTS

| | | |
|---|---|---|
| CN | 101587256 | 11/2009 |
| JP | 2008077188 | 4/2008 |

* cited by examiner

*Primary Examiner* — Jonathan Horner
*Assistant Examiner* — Jose Soto Lopez
(74) *Attorney, Agent, or Firm* — WPAT, PC; Justin King

(57) ABSTRACT

A locating method for an optical touch device to calculate a position of a light blocking object is provided. The optical touch device includes a number of image detecting components. Each of the image detecting components includes a number of pixels arranged in a straight line. In the locating method, the pixels of each of the image detecting components are at least divided into a first group and a second group. When the first group detects a dark point caused by the light blocking object, the position of the dark point is calculated using a first calculating method. When the second group detects the dark point, the position of the dark point is calculated using a second calculating method. The locating method can determine the position of the light blocking object accurately. An optical touch device that is suitable for using the locating method is also provided.

19 Claims, 3 Drawing Sheets

LOCATING METHOD OF OPTICAL TOUCH DEVICE AND OPTICAL TOUCH DEVICE

CROSS-REFERENCE TO RELATED APPLICATIONS

This application is based upon and claims the benefit of priority from the prior Taiwanese Patent Application No. 098138898, filed Nov. 16, 2009, the entire contents of which are incorporated herein by reference.

BACKGROUND

1. Field of the Invention

The present invention relates to a touch device, and particularly to a locating method of an optical touch device and an optical touch device that is suitable for using the locating method.

2. Description of the Related Art

Nowadays, a touch function has been one of necessary functions of many electronic devices. A touch device is an important component to achieve the touch function. Generally, a familiar type of the touch device is, for example, a resistive touch device, a capacitive touch device or an optical touch device. The electronic devices can be equipped with various touch devices in accordance with the various demands.

FIG. 1 is a schematic view of a conventional optical touch device. Referring to FIG. 1, the conventional optical touch device 100 includes a light guide module 110, a light source module 120 and an image detecting module 130. The light guide module 110 includes three light reflecting bars 112a, 112b and 112c arranged along three sides of a rectangle. The light reflecting bar 112a faces to the light reflecting bar 112c and the light reflecting bar 112b is connected between the light guide bar 112a and the light reflecting bar 112c. The area in the rectangle defines a detecting area 114. The light source module 120 includes two light emitting components 122a and 122b. The light emitting component 122a is disposed at an end of the light guide bar 112a far away from the light guide bar 112b, and the light emitting component 122b is disposed at an end of the light guide bar 112c far away from the light guide bar 112b. The light source module 120 is configured for emitting light to the three light reflecting bars 112a, 112b and 112c. The three light reflecting bars 112a, 112b and 112c are configured for reflecting the light from the light source module 120 to irradiate the detecting area 114. The image detecting module 130 includes two image detecting components 132a and 132b. The image detecting component 132a is disposed at the end of the light reflecting bar 112a far away from the light reflecting bar 112b, and the image detecting component 132b is disposed at the end of the light reflecting bar 112c far away from the light reflecting bar 112b. Each of the two image detecting components 132a and 132b includes a number of pixels 135 arranged in a straight line. The pixels 135 are configured for detecting a light blocking object (i.e., a touch point) in the detecting area 114, thereby calculating a position (i.e., coordinates) of the light blocking object in accordance with the information detected by the pixels 135.

In detail, a field of view (FOV) of the image detecting component 132a covers the light reflecting bars 112b and 112c. That is, the pixels 135 of the image detecting component 132a are configured for detecting the light reflecting bars 112b and 112c. When the light blocking object is located in the detecting area 114 and a dark point caused by the light blocking object is located at the light reflecting bar 112b, the light reflecting bar 112c, or a connecting portion of the light reflecting bar 112b and the light reflecting bar 112c, the dark point can be detected by some pixels 135 of the image detecting component 132a. Similarly, a field of view of the image detecting component 132b covers the light reflecting bars 112a and 112b. That is, the pixels 135 of the image detecting component 132a are configured for detecting the light reflecting bars 112a and 112b. When the light blocking object is located in the detecting area 114 and a dark point caused by the light blocking object is located at the light reflecting bar 112a, the light reflecting bar 112b, or a connecting portion of the light reflecting bar 112a and the light reflecting bar 112b, the dark point can be detected by some pixels 135 of the image detecting component 132b.

Generally, the conventional optical touch device 100 calculates the position of the dark point caused by the light blocking object using either a medium center calculating method or a gravity center calculating method, thereby determining the position of the light blocking object. However, positions of the dark points caused by all light blocking objects in the detecting area 114 can not be calculated accurately using either the medium center calculating method or the gravity center calculating method. For example, in the case of using the medium center calculating method to calculate the position of the dark point, the detecting area 114 of conventional optical touch device 100 has an insensitive area 114a. If the light blocking object is just located in the insensitive area 114a, the calculated position of the dark point will generate an inaccuracy due to a large offset angle of the light. In addition, if the position of the dark point is calculated using the gravity center calculating method and the dark point caused by the light blocking object is just located at the connecting portion of two neighboring light reflecting bars, the calculated position of the dark point will generate an inaccuracy.

Referring to FIG. 2, the medium center calculating method is described in detail by using the image detecting component 132b as an example. A light blocking object A is located in the insensitive area 114a, and the image detecting component 132b is configured for detecting a dark point A1 caused by the light blocking object A. The dark point A1 is located at the light reflecting bar 112a. During a process of detecting the dark point A1, the dark point A1 can be detected by some pixels 135, for example, from the n-th pixel 135n to the r-th pixel 135r, of the image detecting component 132b. The calculated center position of the dark point A1 using the medium center calculating method is equal to (n+r)/2. That is, the center of the dark point A1 corresponds to the (n+r)/2-th pixel 135m. But, in fact, a straight line L passing through the center of the light blocking object A and the center of the dark point A1 is connected to the pixel 135m'. In other words, the accurate center of the dark point A1 should correspond to the pixel 135m' rather than the pixel 135m. Similarly, the image detecting component 132a has the above-mentioned problem. Therefore, when the position of the dark point caused by the light blocking object in the insensitive area 114a is calculated using the medium center calculating method, the calculated position of the dark point will generate an inaccuracy.

Referring to FIG. 3, the gravity center calculating method is described in detail by using the image detecting component 132a as an example. A light blocking object B is located in the detecting area 114, and the image detecting component 132a is configured for detecting a dark point B1 caused by the light blocking object B. The dark point B1 is located at the connecting portion of the light reflecting bar 112b and the light reflecting bar 112c. During a process of detecting the dark point B1, the dark point B1 can be detected by some pixels 135, for example, from the x-th pixel 135x to the y-th pixel 135y, of the image detecting component 132a. A calculating formula of the gravity center calculating method is as follow:

$$Cg = \frac{\sum_{w=x}^{y} |bg[w] - img[w]| \times w}{\sum_{w=x}^{y} |bg[w] - img[w]|}$$

In the formula, w represents the w-th pixel, bg[w] represents a background brightness of the w-th pixel, img[w] represents an image brightness of the image detected by the w-th pixel, and Cg represents the calculated gravity center position of the dark point B1 caused by the light blocking object B. However, the conventional optical touch device 100 has poor light irradiation at the connecting portion of the light reflecting bar 112b and the light reflecting bar 112c. When the dark point B1 is located at the connecting portion of the light reflecting bar 112b and the light reflecting bar 112c as shown in FIG. 3, the background brightness and the image brightness detected by the pixels 135 of the image detecting components 132a are inaccurate. Therefore, a large error between the calculated position of the dark point B1 and the actual position of the dark point B1 will generate.

As mentioned above, the conventional locating method can not accurately calculate the position of the dark point caused by the light blocking object located in any area of the detecting area 114. Thus, the conventional optical touch device 100 can not determine the position of the light blocking object accurately.

BRIEF SUMMARY

The present invention provides a locating method of an optical touch device so as to determine a position of a light blocking object accurately.

The present invention also provides an optical touch device to so as to determine a position of a light blocking object accurately.

To achieve the above-mentioned advantages, the present invention provides a locating method of an optical touch device. The locating method is suitable for an optical touch device to calculate a position of a light blocking object. The optical touch device includes a number of image detecting components. Each of the image detecting components includes a number of pixels arranged in a straight line. In the locating method, the pixels of each of the image detecting components are at least divided into a first group and a second group. When the first group detects a dark point caused by the light blocking object, a position of the dark point is calculated using a first calculating method. When the second group detects the dark point caused by the light blocking object, the position of the dark point is calculated using a second calculating method.

In one embodiment provided by the present invention, the first calculating method is a gravity center calculating method, and the second calculating method is a medium center calculating method.

In one embodiment provided by the present invention, the optical touch device includes a detecting area, a field of view of the second group of each of the image detecting components covers a corner area of the detecting area, and the corner area faces to the corresponding image detecting component.

In one embodiment provided by the present invention, the pixels of each of the image detecting components are divided into the first group, the second group and a third group. The third group is located between the first group and the second group. When the third group detects the dark point caused by the light blocking object, the position of the dark point is calculated using a third calculating method.

In one embodiment provided by the present invention, the third calculating method includes the steps of: calculating the position of the dark point caused by the light blocking object using the first calculating method and the second calculating method respectively to obtain a first value and a second value; multiplying the first value with a first weight a $(0<\alpha<1)$ to obtain a third value and multiplying the second value with a second weight $(1-\alpha)$ to obtain a fourth value; and adding the third value and the fourth value together.

In one embodiment provided by the present invention, when the pixels of the third group detecting the dark point caused by the light blocking object becomes closer to the first group, the first weight a becomes lager correspondingly.

In one embodiment provided by the present invention, the pixels of each of the image detecting components are divided into the first group, the second group, the third group and a fourth group. The second group is located between the third group and the fourth group. When the fourth group detects the dark point caused by the light blocking object, the position of the dark point is calculated using either the first calculating method or the third calculating method.

To achieve the above-mentioned advantages, the present invention also provides an optical touch device including a frame, a light source module, a first image detecting component and a second image detecting component. The frame includes a first sidewall, a second sidewall, a third sidewall and a fourth sidewall. The first sidewall faces to the third sidewall and the second sidewall faces to the fourth sidewall. The frame defines a detecting area therein. The light source module is configured for providing light to the detecting area. The first image detecting component is disposed between two neighboring ends of the first sidewall and the second sidewall. A field of view of the first image detecting component covers the third sidewall and the fourth sidewall. The second image detecting component is disposed between two neighboring ends of the second sidewall and the third sidewall. A field of view of the second image detecting component covers the first sidewall and the fourth sidewall. Each of the first image detecting component and the second image detecting component includes a number of pixels arranged in a straight line. The pixels of each of the first image detecting component and the second image detecting component are at least divided into a first group and a second group. When the first group detects a dark point caused by a light blocking object, a position of the dark point is calculated using a first calculating method. When the second group detects the dark point caused by the light blocking object, the position of the dark point is calculated using a second calculating method.

In one embodiment provided by the present invention, the third sidewall includes a first section connected to the second sidewall and a second section connected to the fourth sidewall. The first group of the first image detecting component is configured for detecting the first section, and the second group of the first image detecting component is configured for detecting the second section and the fourth sidewall. The first sidewall includes a third section connected to the second sidewall and a fourth section connected to the fourth sidewall. The first group of the second image detecting component is configured for detecting the third section, and the second group of the second image detecting component is configured for detecting the fourth section and the fourth sidewall.

In one embodiment provided by the present invention, a portion of the pixels of each of the first image detecting component and the second image detecting component are further divided into a third group. The third group is located between the first group and the second group. When the third group detects the dark point caused by the light blocking object, the position of the dark point is calculated using a third calculating method.

In one embodiment provided by the present invention, the third sidewall includes a first section connected to the second sidewall, a second section connected to the fourth sidewall and a fifth section connected between the first section and the second section. The first group of the first image detecting component is configured for detecting the first section, the second group of the first image detecting component is configured for detecting the second section and the fourth sidewall, and the third group of the first image detecting component is configured for detecting the fifth section. The first sidewall includes a third section connected to the second sidewall, a fourth section connected to the fourth sidewall and a sixth section connected between the third section and the fourth section. The first group of the second image detecting component is configured for detecting the third section, the second group of the second image detecting component is configured for detecting the fourth section and the fourth sidewall, and the third group of the second image detecting component is configured for detecting the sixth section.

In one embodiment provided by the present invention, a portion of the pixels of each of the first image detecting component and the second image detecting component are further divided into a third group and a fourth group. The third group is located between the first group and the second group. The second group is located between the third group and the fourth group. When the third group detects the dark point caused by the light blocking object, the position of the dark point is calculated using a third calculating method. When the fourth group detects the dark point caused by the light blocking object, the position of the dark point is calculated using either the first calculating method or the third calculating method.

In one embodiment provided by the present invention, the third sidewall includes a first section connected to the second sidewall, a second section connected to the fourth sidewall and a fifth section connected between the first section and the second section. The first group of the first image detecting component is configured for detecting the first section, the second group of the first image detecting component is configured for detecting the second section and a section of the fourth sidewall that is adjacent to the third sidewall, the third group of the first image detecting component is configured for detecting the fifth section, and the fourth group of the first image detecting component is configured for detecting a section of the fourth sidewall that is adjacent to the first sidewall. The first sidewall includes a third section connected to the second sidewall, a fourth section connected to the fourth sidewall and a sixth section connected between the third section and the fourth section. The first group of the second image detecting component is configured for detecting the third section, the second group of the second image detecting component is configured for detecting the fourth section and a section of the fourth sidewall that is adjacent to the first sidewall, the third group of the second image detecting component is configured for detecting the sixth section, and the fourth group of the second image detecting component is configured for detecting a section of the fourth sidewall that is adjacent to the third sidewall.

In one embodiment provided by the present invention, the optical touch device further includes a number of light guide components, and the light guide components are at least disposed on the first sidewall, the third sidewall and the fourth sidewall.

In the locating method and the optical touch device of the present invention, the pixels of each of the image components are divided into a number of groups. When the pixels of one of the groups detect the dark point caused by the light blocking object, a suitable calculating method is used to calculate the position of the dark point. Thus, the accurate position of the dark point can be calculated, thereby improving the accuracy of locating the light blocking object.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
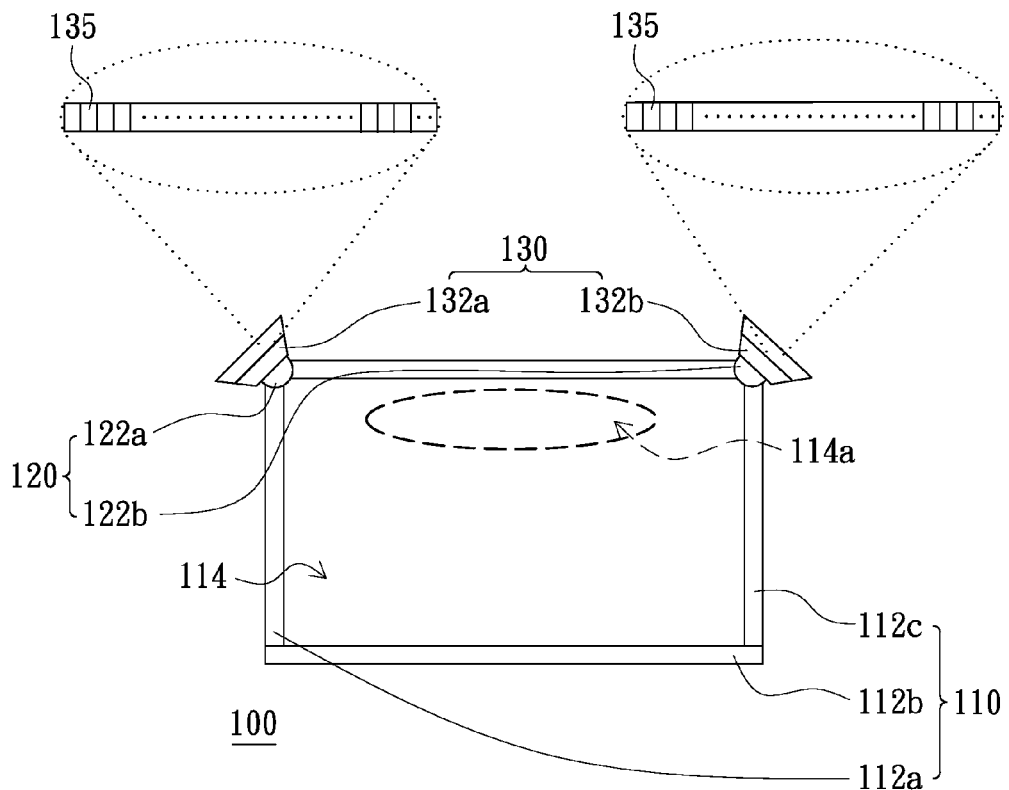
FIG. 1 is a schematic view of a conventional optical touch device.
Figure 2:
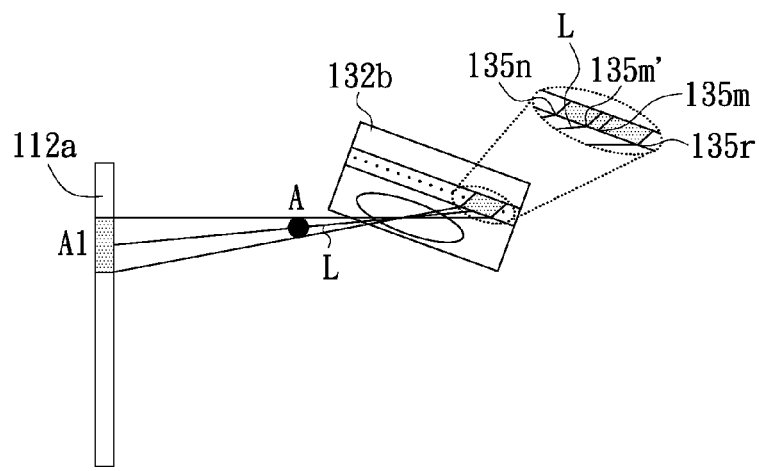
FIG. 2 is a schematic view of using a medium center calculating method to calculate a dark point caused by a light blocking object in an insensitive area shown in FIG. 1.
Figure 3:
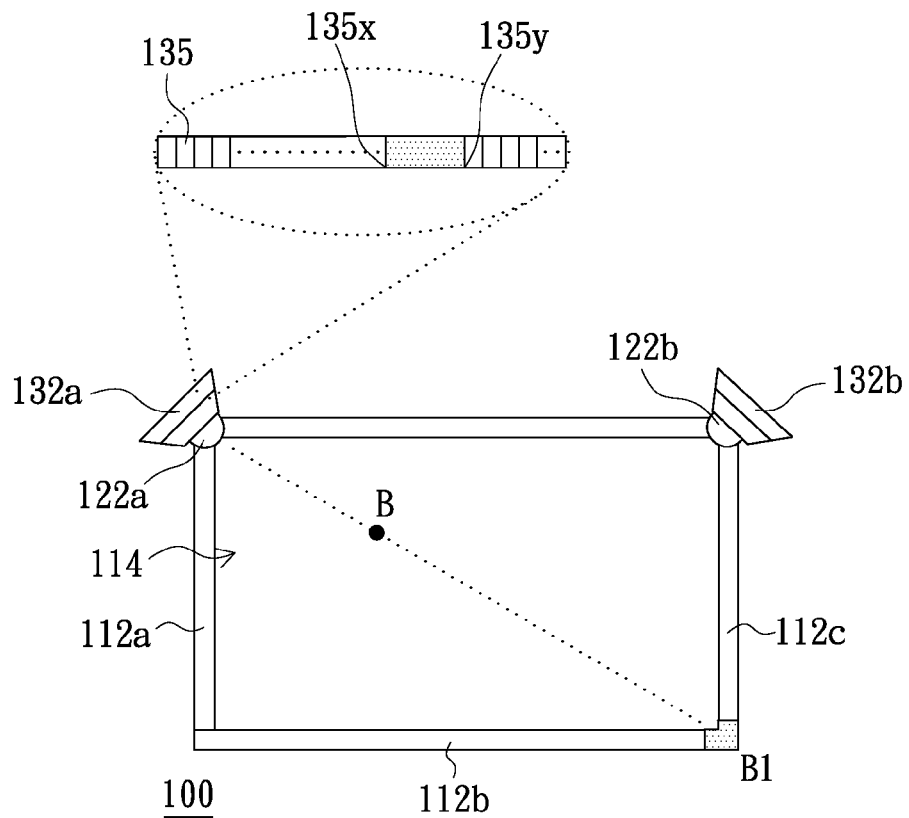
FIG. 3 is a schematic view of using a gravity center calculating method to calculate a dark point caused by a light blocking object in a detecting area shown in FIG. 1.
Figure 4:
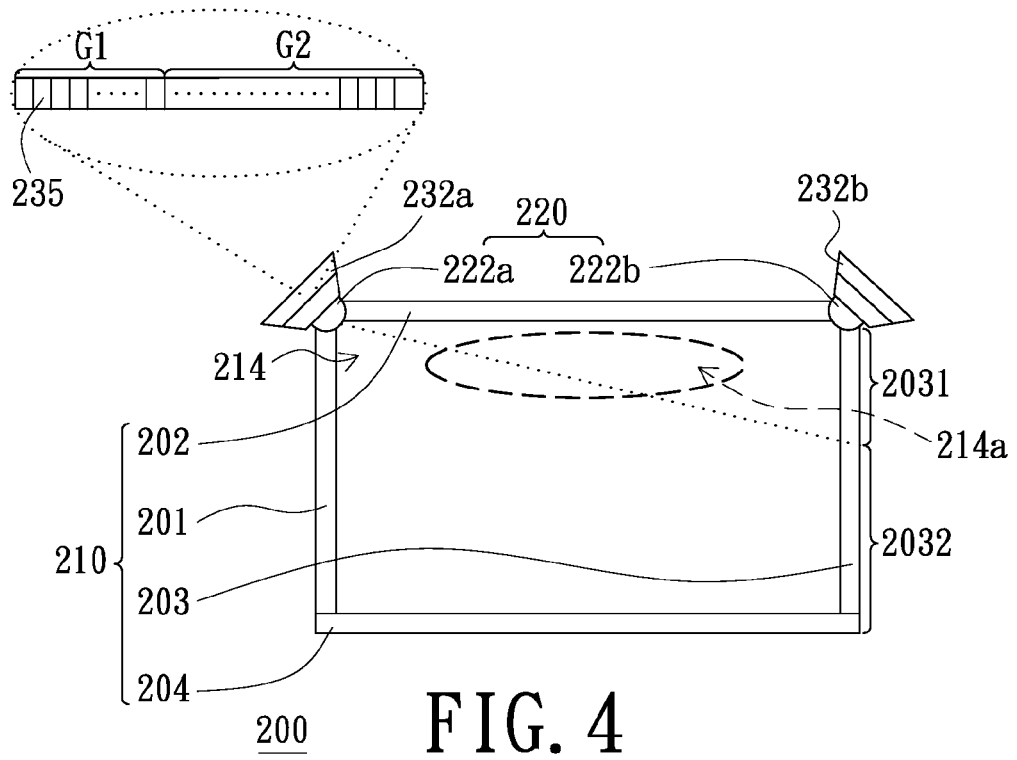
FIG. 4 is a schematic view of a locating method of an optical touch device applied to an optical touch device in accordance with an embodiment of the present invention.

FIG. 4 is a schematic view of a locating method of an optical touch device applied to an optical touch device in accordance with an embodiment of the present invention. Referring to FIG. 4, the locating method applied to an optical touch device 200 will be described here. It is noted that the locating method can be, but not limited to, applied to the optical touch device 200. The locating method also can be applied to the other optical touch devices.

The optical touch device 200 includes a frame 210, a light source module 220 and a first image detecting component 232a and a second image detecting component 232b. In the present embodiment, the frame 210 is, for example, a rectangular frame. The frame 210 includes a first sidewall 201, a second sidewall 202, a third sidewall 203 and a fourth sidewall 204. The first sidewall 201 faces to the third sidewall 203 and the second sidewall 202 faces to the fourth sidewall 204. The frame 210 defines a detecting area 214 therein. In other words, the first sidewall 201, the second sidewall 202, the third sidewall 203 and the fourth sidewall 204 defines the detecting area 214 therebetween. The detecting area 214 is, for example, a rectangular area. The light source module 220 is configured for providing light to the detecting area 214. The first image detecting component 232a and the second image detecting component 232b are configured for detecting the optical information of a light blocking object in the detecting area 214.

Additionally, in the present embodiment, a light guide component (not shown) can be disposed on the first sidewall 210, the third sidewall 203 and the fourth sidewall 204 of the frame 210 respectively. The light guide component can be either a light guide bar or a light reflecting bar. It is noted that a light guide component can also be disposed on the second sidewall 202.

The light source module 220 includes, for example, a first light emitting component 222a and a second light emitting component 222b. In the present embodiment, the first light emitting component 222a is, for example, disposed between two neighboring ends of the first sidewall 201 and the second sidewall 202 of the frame 210. The second light emitting component 222b is, for example, disposed between two neighboring ends of the second sidewall 202 and the third sidewall 203 of the frame 210. The first light emitting component 222a and the second light emitting component 222b are configured for emitting light towards the detecting area 214 so as to provide the light to the detecting area 214. In addition, each of the first light emitting component 222a and the second light emitting component 222b can be, but not limited to, a light emitting diode.

The first image detecting component 232a is disposed between two neighboring ends of the first sidewall 201 and the second sidewall 202 of the frame 210. A field of view of the first image detecting component 232a covers the third sidewall 203 and the fourth sidewall 204 of the frame 210. The second image detecting component 232b is disposed between two neighboring ends of the second sidewall 202 and the third sidewall 203 of the frame 210. A field of view of the second image detecting component 232b covers the first sidewall 201 and the fourth sidewall 204 of the frame 210. Each of the first image detecting component 232a and the second image detecting component 232b includes a number of pixels 235 arranged in a straight line. In addition, each of the first image detecting component 232a and the second image detecting component 232b further includes a digital signal processing unit (not shown). The digital signal processing unit is configured for processing a signal detected by the pixels 235 and sending the processed signal to a central processing unit (not shown). Thus, the central processing unit can calculate the position of the light blocking object. The signal detected by the pixels 235 is, for example, a position of a dark point detected by the pixels 235.

A locating method suitable being applied to the optical touch device 200 will be described in detail.

The pixels 235 of each of the first image detecting component 232a and the second image detecting component 232b are divided. The first image detecting component 232a is an example to describe the details. The pixels 235 of the first image detecting component 232a are divided into a first group G1 and a second group G2. When the first group G1 detects a dark point caused by a light blocking object in the detecting area 214, a position of the dark point is calculated using a first calculating method. When the second group G2 detects the dark point caused by the light blocking object in the detecting area 214, the position of the dark point is calculated using a second calculating method.

Because the pixels 235 of the first image detecting component 232a are divided into the first group G1 and the second group G2, the third sidewall 203 is divided into a first section 2031 connected to the second sidewall 202 and a second section 2032 connected to the fourth sidewall 204 correspondingly. The dark point locating at the first section 2031 of the third sidewall 203 can be detected by the first group G1 of the first image detecting component 232a. Thus, the position of the dark point can be calculated using the first calculating method, thereby determining the position of the light blocking object. The dark point locating at the fourth sidewall 204 and the second section 2032 of the third sidewall 203 can be detected by the second group G2 of the first image detecting component 232a. Thus, the position of the dark point can be calculated using the second calculating method, thereby determining the position of the light blocking object. The connecting portion of the fourth sidewall 204 and the second section 2032 of the third sidewall 203 is a corner area of the detecting area 214. The corner area faces to the first image detecting component 232a. In other words, the field of view of the second group G2 of the first image detecting component 232a covers the corner area of the detecting area 214. In the present embodiment, the first calculating method can be, but not limited to, a gravity center calculating method, and the second calculating method can be, but not limited to, a medium center calculating method.

For the first image detecting component 232a, the dark point locating at the first section 2031 of the third sidewall 203 is generally caused by the light blocking object in a region 214a (i.e., the conventional insensitive area) of the detecting area 214. Because the position of the dark point caused by the light blocking object in the region 214a is calculated using the gravity center calculating method rather than the medium center calculating method, the accuracy of determining the position of the light blocking object can be improved. Additionally, for the first image detecting component 232a, the dark point formed on the connecting portion of fourth sidewall 204 and the third sidewall 203 locates at the fourth sidewall 204 and the second section 2032 of the third sidewall 203. In the present embodiment, because the position of the dark point located at the fourth sidewall 204 and the second section 2032 of the third sidewall 203 is calculated using the medium center calculating method rather than the gravity center calculating method, the accuracy of determining the position of the light blocking object can be improved.

Additionally, the dividing method of the pixels 235 of the second image detecting component 232b is similar to the dividing method of the pixels 235 of the first image detecting component 232a as above-mentioned and is not described here. Correspondingly, the first sidewall 201 includes a third section (not labeled) connected to the second sidewall 202 and a fourth section (not labeled) connected to the fourth sidewall 204. The first group G1 of the second image detecting component 232b is configured for detecting the third section, and the second group G2 of the second image detecting component 232b is configured for detecting the fourth sidewall 204 and the fourth section of the first sidewall 201. The calculating method of the position of the dark point detected by the first group G1 and the second group G2 of the second image detecting component 232b is similar to the calculating method of the first image detecting component 232a as above-mentioned and is not described here.

As aforesaid description, in the present embodiment, in the locating method of the optical touch device 200, the pixels 235 of each of the first image detecting component 232a and the second image detecting component 232b are divided into a number of groups. When the pixels 235 of one of the groups detect the dark point caused by the light blocking object in the detecting area 214, a suitable calculating method is used to calculate the position of the dark point. Thus, the accurate position of the dark point can be calculated, thereby improving the accuracy of locating the light blocking object.

Figure 5:
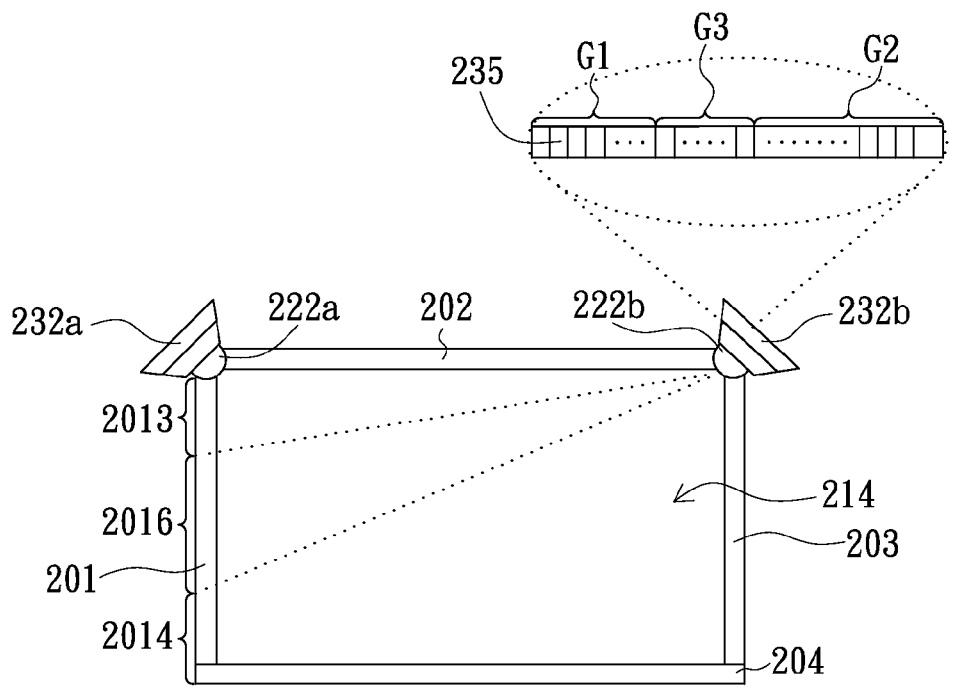
FIG. 5 is a schematic view of a locating method of an optical touch device applied to an optical touch device in accordance with another embodiment of the present invention.

FIG. 5 is a schematic view of a locating method of an optical touch device applied to an optical touch device in accordance with a second embodiment of the present invention. Referring to FIG. 5, the locating method is similar to the locating method in the first embodiment except that the pixels 235 of each of the first image detecting component 232a and the second image detecting component 232b are divided into three groups. The second image detecting component 232b is an example here to describe the details. The pixels 235 of the second image detecting component 232b are divided into a first group G1, a second group G2 and a third group G3. The third group G3 is located between the first group G1 and the second group G2.

Because the pixels 235 of the second image detecting component 232b are divided into the first group G1, the second group G2 and the third group G3, the first sidewall 201 is divided into a third section 2013 connected to the second sidewall 202, a fourth section 2014 connected to the fourth sidewall 204 and a sixth section 2016 connected between the third section 2013 and the fourth section 2014 correspondingly. The dark point locating at the third section 2013 of the first sidewall 201 can be detected by the first group G1 of the second image detecting component 232ab. The dark point locating at the fourth sidewall 204 and the fourth section 2014 of the first sidewall 201 can be detected by the second group G2 of the second image detecting component 232b. The dark point locating at the sixth section 2016 of the first sidewall 201 can be detected by the third group G3 of the second image detecting component 232b. The connecting portion of the fourth sidewall 204 and the fourth section 2014 of the first sidewall 201 is a corner area of the detecting area 214. The corner area faces to the second image detecting component 232b. In other words, the field of view of the second group G2 of the second image detecting component 232b covers the corner area of the detecting area 214.

Similar to the first embodiment, when the first group G1 detects the dark point caused by the light blocking object in the detecting area 214, the position of the dark point is calculated using the first calculating method, thereby determining the position of the light blocking object. When the second group G2 detects the dark point caused by the light blocking object in the detecting area 214, the position of the dark point is calculated using the second calculating method, thereby determining the position of the light blocking object. In addition, when the third group G3 detects the dark point caused by the light blocking object in the detecting area 214, the position of the dark point is calculated using a third calculating method, thereby determining the position of the light blocking object.

In the present embodiment, the first calculating method can be, but not limited to, a gravity center calculating method, and the second calculating method can be, but not limited to, a medium center calculating method. In addition, the third calculating method is, for example, a combination of the first calculating method and the second calculating method. In detail, the third calculating method includes the following steps.

Firstly, the position of the dark point caused by the light blocking object is calculated using the first calculating method and the second calculating method respectively to obtain a first value and a second value. For example, when the first group G3 of the second image detecting component 232b detects the dark point caused by the light blocking object in the detecting area 214, the position of the dark point is calculated using the first calculating method (e.g., the gravity center calculating method), thereby obtaining the first value Ci and the position of the dark point is also calculated using the second calculating method (e.g., the medium center calculating method), thereby obtaining the second value Cm. The first value Ci represents a calculated result using the first calculating method, and the second value Cm represents a calculated result using the second calculating method.

Next, the first value Ci is multiplied by a first weight a ($0<\alpha<1$) to obtain a third value Ci', and the second value Cm is multiplied by a second weight ($1-\alpha$) to obtain a fourth value Cm'. The first weight a can be a constant. In other words, the first weight $\alpha$ is identical when any of the pixels 235 of the third group G3 detects the dark point. In another embodiment, the first weight a can be a variable value. That is, when the different pixels 235 of the third group G3 detect the dark point caused by the light blocking object, the first weight $\alpha$ is different correspondingly. For example, when the pixels 235 of the third group G3 detecting the dark point caused by the light blocking object become closer to the first group G1, the first weight a becomes lager and the second weight ($1-\alpha$) becomes smaller correspondingly.

Then, the third value Ci' and the fourth value Cm' are added together to obtain the position of the dark point, thereby determining the position of the light blocking object.

In the present embodiment, the dividing method of the pixels 235 of the first image detecting component 232a is similar to the dividing method of the pixels 235 of the second image detecting component 232b as above-mentioned and is not described here. Correspondingly, the third sidewall 203 includes a first section (not labeled) connected to the second sidewall 202, a second section (not labeled) connected to the fourth sidewall 204 and a fifth section (not labeled) connected between the first section and the second section. The first group G1 of the first image detecting component 232a is configured for detecting the first section of the third sidewall 203, the second group G2 of the first image detecting component 232a is configured for detecting the fourth sidewall 204 and the second section of the third sidewall 203 and the third group G3 of the first image detecting component 232a is configured for detecting the fifth section of the third sidewall 203. The calculating method of the position of the dark point detected by the first group G1, the second group G2 and the third group G3 of the first image detecting component 232a is similar to the calculating method of the second image detecting component 232b as above-mentioned and is not described here.

Figure 6:
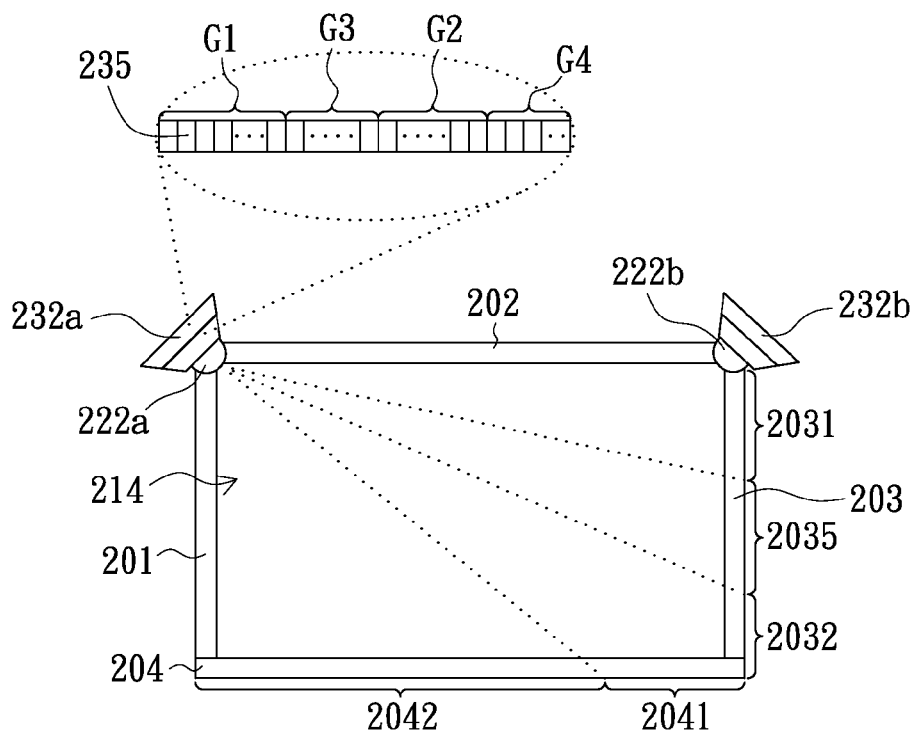
FIG. 6 is a schematic view of a locating method of an optical touch device applied to an optical touch device in accordance with further another embodiment of the present invention.

FIG. 6 is a schematic view of a locating method of an optical touch device applied to an optical touch device in accordance with a third embodiment of the present invention. Referring to FIG. 6, the locating method in the third embodiment is similar to the locating method in the second embodiment except that the pixels 235 of each of the first image detecting component 232a and the second image detecting component 232b are divided into four groups. The first image detecting component 232a is an example here to describe the details. The pixels 235 of the first image detecting component 232a are divided into a first group G1, a second group G2, a third group G3 and a fourth group G4. The third group G3 is located between the first group G1 and the second group G2, and the second group G2 is located between the third group G3 and the fourth group G4.

Because the pixels 235 of the first image detecting component 232a are divided into the first group G1, the second group G2, the third group G3 and the fourth group G4, the third sidewall 203 is divided into a first section 2031 connected to the second sidewall 202, a second section 2032 connected to the fourth sidewall 204 and a fifth section 2035 connected between the first section 2031 and the second section 2032 correspondingly. The fourth sidewall 204 is divided into a section 2041 adjacent to the third sidewall 203 and a section 2042 adjacent to the first sidewall 201 correspondingly. The dark point locating at the first section 2031 of the third sidewall 203 can be detected by the first group G1 of the first image detecting component 232a. The dark point locating at the second section 2032 of the third sidewall 203 and the section 2041 adjacent to the third sidewall 203 of the fourth sidewall 204 and can be detected by the second group G2 of the first image detecting component 232a. The dark point locating at the fifth section 2035 of the third sidewall 203 can be detected by the third group G3 of the first image detecting component 232a. The dark point locating at the section 2042 adjacent to the first sidewall 201 of the fourth sidewall 204 and can be detected by the second group G4 of the first image detecting component 232a. The connecting portion of the section 2041 adjacent to the third sidewall 203 of the fourth sidewall 204 and the second section 2032 of the third sidewall 203 is a corner area of the detecting area 214. The corner area faces to the first image detecting component 232a. In other words, the field of view of the second group G2 of the first image detecting component 232a covers the corner area of the detecting area 214.

Similar to the second embodiment, when the first group G1 detects the dark point caused by the light blocking object in the detecting area 214, the position of the dark point is calculated using the first calculating method, thereby determining the position of the light blocking object. When the second group G2 detects the dark point caused by the light blocking object in the detecting area 214, the position of the dark point is calculated using the second calculating method, thereby determining the position of the light blocking object. When the third group G3 detects the dark point caused by the light blocking object in the detecting area 214, the position of the dark point is calculated using the third calculating method, thereby determining the position of the light blocking object. In addition, when the fourth group G4 detects the dark point caused by the light blocking object in the detecting area 214, the position of the dark point is calculated using either the first calculating method or the third calculating method, thereby determining the position of the light blocking object.

In the present embodiment, the first calculating method, the second calculating method and the third calculating method are similar to those method described in the second embodiment. The dividing method of the pixels 235 of the second image detecting component 232b is similar to the dividing method of the pixels 235 of the first image detecting component 232a as above-mentioned and is not described here. Correspondingly, the first sidewall 201 includes a third section (not labeled) connected to the second sidewall 202, a fourth section (not labeled) connected to the fourth sidewall 204 and a sixth section (not labeled) connected between the third section and the fourth section. The first group G1 of the second image detecting component 232b is configured for detecting the third section, the second group G2 of the second image detecting component 232b is configured for detecting a section adjacent to the first sidewall 201 of the fourth sidewall 204 and the fourth section of the first sidewall 201, the third group G3 of the second image detecting component 232b is configured for detecting the sixth section, and the fourth group G4 of the second image detecting component 232b is configured for detecting a section adjacent to the third sidewall 203 of the fourth sidewall 204. The calculating method of the position of the dark point detected by the first group G1, the second group G2, the third group G3 and the fourth group G4 of the second image detecting component 232b is similar to the calculating method of the first image detecting component 232a as above-mentioned and is not described here.

In summary, in the locating method and the optical touch device of the present invention, the pixels of each of the image detecting components are divided into a number of groups. When the pixels of one of the groups detect the dark point caused by the light blocking object, a suitable calculating method is used to calculate the position of the dark point. For example, the position of the dark point caused by the light blocking object in the conventional insensitive area is calculated using the gravity center calculating method. For another example, the position of the dark point located at the connecting portion of two neighboring sidewalls is calculated using the medium center calculating method. Thus, the accurate position of the dark point can be calculated, thereby improving the accuracy of locating the light blocking object.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A locating method for an optical touch device to calculate a position of a light blocking object in a detecting area of the optical touch device, the optical touch device comprising a plurality of image detecting components, each of the image detecting components having a plurality of pixels arranged in a straight line, the locating method comprising:

dividing the pixels of each of the image detecting components at least into a first group and a second group, the first group being configured for detecting a first partial field of view and the second group being configured for detecting a second partial field of view, and the first partial field of view and second partial field of view of the same image detecting component being different and not overlapped with each other, wherein the first group and the second group of the same image detecting component detect different portions of the detecting area, the portions detected by the first group and the second group are not overlapped with each other, in each of the image detecting components, when the first group detects a dark point caused by the light blocking object, the position of the dark point imaged in the pixels of the first group is calculated using a first calculating method, and when the second group detects the dark point caused by the light blocking object, the position of the dark point imaged in the pixels of the second group is calculated using a second calculating method.

2. The locating method as claimed in claim 1, wherein the first calculating method is a gravity center calculating method, and the second calculating method is a medium center calculating method.

3. The locating method as claimed in claim 2, wherein the optical touch device comprises a detecting area, a field of view of the second group of each of the image detecting components covers a corner area of the detecting area, and the corner area faces to the corresponding image detecting component.

4. The locating method as claimed in claim 1, wherein the pixels of each of the image detecting components are divided into the first group, the second group and a third group between the first group and the second group, wherein the first group, the second group and the third group of the same image detecting component detect different portions of the detecting area, the portions detected by the first group, the second group and the third group are not overlapped with each other, and when the third group detects the dark point caused by the light blocking object, the position of the dark point imaged in the pixels of the third group is calculated using a third calculating method.

5. The locating method as claimed in claim 4, wherein the third calculating method comprises the steps of:

calculating the position of the dark point caused by the light blocking object imaged in the pixels of the third group using the first calculating method and the second calculating method respectively to obtain a first value and a second value;

multiplying the first value with a first weight a to obtain a third value and multiplying the second value with a second weight (1−α) to obtain a fourth value, and 0<α<1; and adding the third value and the fourth value together.

6. The locating method as claimed in claim 5, wherein when the pixels of the third group detecting the dark point caused by the light blocking object become closer to the first group, the first weight a becomes lager correspondingly.

7. The locating method as claimed in claim 4, wherein the pixels of each of the image detecting components are divided into the first group, the second group, the third group and a fourth group, the second group is located between the third group and the fourth group, wherein the first group, the second group, the third group and the fourth group of the same image detecting component detect different portions of the detecting area, the portions detected by the first group, the second group, the third group and the fourth group are not overlapped with each other, and when the fourth group detects the dark point caused by the light blocking object, the position of the dark point is calculated using either the first calculating method or the third calculating method.

8. The locating method as claimed in claim 2, wherein the detecting area has a first corner area, a second corner area, a third corner area and a fourth corner area, wherein the first corner area and the third corner area are opposite to each other diagonally, the second corner area and the fourth corner area are opposite to each other diagonally, one of the image detecting components is set at the first corner area, the field of view of the second group of the image detecting component set at the first corner covers the third corner area, and the field of view of the first group of the image detecting component set at the first corner does not cover the third corner area.

9. An optical touch device, comprising:

a frame comprising a first sidewall, a second sidewall, a third sidewall and a fourth sidewall, the first sidewall facing to the third sidewall, the second sidewall facing to the fourth sidewall, the frame defining a detecting area therein;

a light source module configured for providing light to the detecting area;

a first image detecting component disposed between two neighboring ends of the first sidewall and the second sidewall, and a field of view of the first image detecting component covering the third sidewall and the fourth sidewall; and a second image detecting component disposed between two neighboring ends of the second sidewall and the third sidewall, and a field of view of the second image detecting component covers the first sidewall and the fourth sidewall;

wherein each of the first image detecting component and the second image detecting component comprises a plurality of pixels arranged in a straight line, the pixels of each of the first image detecting component and the second image detecting component at least comprises a first group and a second group, the first group being configured for detecting a first partial field of view and the second group being configured for detecting a second partial field of view, and the first partial field of view and second partial field of view of the same first image detecting component being different and not overlapped with each other, the first partial field of view and second partial field of view of the second image detecting component being different and not overlapped with each other, wherein the first group and the second group of the same first image detecting component or second image detecting component detect different portions of the detecting area, the portions detected by the first group and the second group are not overlapped with each other, when the first group detects a dark point caused by a light blocking object in the detecting area, a position of the dark point imaged in the pixels of the first group is calculated using a first calculating method, and when the second group detects the dark point caused by the light blocking object in the detecting area, the position of the dark point imaged in the pixels of the second group is calculated using a second calculating method.

10. The optical touch device as claimed in claim 9, wherein the third sidewall comprises a first section connected to the second sidewall and a second section connected to the fourth sidewall, the first group of the first image detecting component is configured for detecting the first section, the second group of the first image detecting component is configured for detecting the second section and the fourth sidewall, the first sidewall comprises a third section connected to the second sidewall and a fourth section connected to the fourth sidewall, the first group of the second image detecting component is configured for detecting the third section, and the second group of the second image detecting component is configured for detecting the fourth section and the fourth sidewall.

11. The optical touch device as claimed in claim 9, wherein the pixels of each of the first image detecting component and the second image detecting component further comprises a third group between the first group and the second group, wherein the first group, the second group and the third group of the same first image detecting component or second image detecting component detect different portions of the detecting area, the portions detected by the first group, the second group and the third group are not overlapped with each other, and when the third group detects the dark point caused by the light blocking object in the detecting area, the position of the dark point imaged in the pixels of the third group is calculated using a third calculating method.

12. The optical touch device as claimed in claim 11, wherein the third sidewall comprises a first section connected to the second sidewall, a second section connected to the fourth sidewall and a fifth section connected between the first section and the second section, the first group of the first image detecting component is configured for detecting the first section, the second group of the first image detecting component is configured for detecting the second section and the fourth sidewall, the third group of the first image detecting component is configured for detecting the fifth section, the first sidewall comprises a third section connected to the second sidewall, a fourth section connected to the fourth sidewall and a sixth section connected between the third section and the fourth section, the first group of the second image detecting component is configured for detecting the third section, the second group of the second image detecting component is configured for detecting the fourth section and the fourth sidewall, and the third group of the second image detecting component is configured for detecting the sixth section.

13. The optical touch device as claimed in claim 9, wherein the pixels of each of the first image detecting component and the second image detecting component further comprises a third group and a fourth group, the third group is located between the first group and the second group, the second group is located between the third group and the fourth group, wherein the first group, the second group, the third group and the fourth group of the same first image detecting component or second image detecting component detect different portions of the detecting area, the portions detected by the first group, the second group, the third group and the fourth group are not overlapped with each other, when the third group detects the dark point caused by the light blocking object in the detecting area, the position of the dark point imaged in the pixels of the third group is calculated using a third calculating method, and when the fourth group detects the dark point caused by the light blocking object in the detecting area, the position of the dark point imaged in the pixels of the fourth group is calculated using either the first calculating method or the third calculating method.

14. The optical touch device as claimed in claim 13, wherein the third sidewall comprises a first section connected to the second sidewall, a second section connected to the fourth sidewall and a fifth section connected between the first section and the second section, the first group of the first image detecting component is configured for detecting the first section, the second group of the first image detecting component is configured for detecting the second section and a section of the fourth sidewall adjacent to the third sidewall, the third group of the first image detecting component is configured for detecting the fifth section, the fourth group of the first image detecting component is configured for detecting a section of the fourth sidewall adjacent to the first sidewall, the first sidewall comprises a third section connected to the second sidewall, a fourth section connected to the fourth sidewall and a sixth section connected between the third section and the fourth section, the first group of the second image detecting component is configured for detecting the third section, the second group of the second image detecting component is configured for detecting the fourth section and a section of the fourth sidewall adjacent to the first sidewall, the third group of the second image detecting component is configured for detecting the sixth section, and the fourth group of the second image detecting component is configured for detecting a section of the fourth sidewall adjacent to the third sidewall.

15. The optical touch device as claimed in claim 9, further comprising a plurality of light guide components, wherein the light guide components are at least disposed on the first sidewall, the third sidewall and the fourth sidewall.

16. The locating method as claimed in claim 4, wherein the first group being configured for detecting a first partial field of view, the second group being configured for detecting a second partial field of view, and the third group being configured for detecting a third partial field of view, and the first partial field of view and second partial field of view and the third partial field of view being different and not overlapped with each other.

17. The locating method as claimed in claim 7, wherein the first group being configured for detecting a first partial field of view, the second group being configured for detecting a second partial field of view, and the third group being configured for detecting a third partial field of view, and the fourth group being configured for detecting a fourth partial field of view, and the first partial field of view and second partial field of view and the third partial field of view and the fourth partial field of view being different and not overlapped with each other.

18. The optical touch device as claimed in claim 11, wherein the first group being configured for detecting a first partial field of view, the second group being configured for detecting a second partial field of view, and the third group being configured for detecting a third partial field of view, and the first partial field of view and second partial field of view and the third partial field of view being different and not overlapped with each other.

19. The optical touch device as claimed in claim 13, wherein the first group being configured for detecting a first partial field of view, the second group being configured for detecting a second partial field of view, and the third group being configured for detecting a third partial field of view, and the fourth group being configured for detecting a fourth partial field of view, and the first partial field of view and second partial field of view and the third partial field of view and the fourth partial field of view being different and not overlapped with each other.

* * * * *